United States Patent
Yaman et al.

(10) Patent No.: US 10,340,649 B2
(45) Date of Patent: Jul. 2, 2019

(54) C-BAND AND L BAND AMPLIFIER DESIGN WITH INCREASED POWER EFFICIENCY AND REDUCED COMPLEXITY

(71) Applicant: NEC LABORATORIES AMERICA, INC., Princeton, NJ (US)

(72) Inventors: Fatih Yaman, Princeton, NJ (US); Shaoliang Zhang, Princeton, NJ (US); Eduardo Mateo Rodriquez, Tokyo (JP); Takanori Inoue, Tokyo (JP); Yoshihisa Inada, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/912,810

(22) Filed: Mar. 6, 2018

(65) Prior Publication Data
US 2018/0261968 A1    Sep. 13, 2018

Related U.S. Application Data

(60) Provisional application No. 62/467,841, filed on Mar. 7, 2017.

(51) Int. Cl.
| | |
|---|---|
| *H04J 14/02* | (2006.01) |
| *H01S 3/067* | (2006.01) |
| *H01S 3/10* | (2006.01) |
| *H01S 3/23* | (2006.01) |
| *H01S 3/16* | (2006.01) |

(52) U.S. Cl.
CPC ........ *H01S 3/0677* (2013.01); *H01S 3/10007* (2013.01); *H01S 3/2383* (2013.01); *H04J 14/02* (2013.01); *H01S 3/06766* (2013.01); *H01S 3/06787* (2013.01); *H01S 3/1608* (2013.01); *H01S 2301/02* (2013.01)

(58) Field of Classification Search
CPC .. H01S 3/0677; H01S 3/10007; H01S 3/2383; H01S 3/1608; H01S 3/06766; H01S 3/06787; H01S 2301/02; H04J 14/02; H04J 14/0213; H04J 14/0206; H04J 14/0212; H04Q 11/0005
See application file for complete search history.

(56) References Cited

U.S. PATENT DOCUMENTS

| | | | | |
|---|---|---|---|---|
| 6,483,636 B1* | 11/2002 | Sugaya | ............... | H01S 3/06754 359/337.2 |
| 2002/0051267 A1* | 5/2002 | Nakamura | ......... | H04B 10/2503 398/92 |
| 2002/0154359 A1* | 10/2002 | Tsuda | ................. | H04B 10/2942 359/337.13 |

* cited by examiner

*Primary Examiner* — Ted M Wang
(74) *Attorney, Agent, or Firm* — Joseph Kolodka

(57) ABSTRACT

Aspects of the present disclosure describe systems, methods, and structures for providing C-band and L-band transmission exhibiting increased power efficiency by diverting a portion of C-band optical energy to an input of L-band optical amplifiers (C-seeding) while optionally employing circulators to eliminate the need for optical isolators.

3 Claims, 10 Drawing Sheets

C-BAND AND L BAND AMPLIFIER DESIGN WITH INCREASED POWER EFFICIENCY AND REDUCED COMPLEXITY

CROSS REFERENCE TO RELATED APPLICATIONS

This application claims the benefit of U.S. Provisional Patent Application Ser. No. 62/467,841 filed Mar. 7, 2017 which is incorporated by reference as if set forth at length herein.

TECHNICAL FIELD

This disclosure relates generally to optical communications and more specifically to novel systems, methods, and structures including C and L band optical amplifiers exhibiting increased power efficiency and reduced complexity.

BACKGROUND

As is known, deploying new optical fiber for optical communications facilities and networks constructed therefrom is quite expensive. Consequently, the art has expended considerable intellectual and financial capital developing and/or deploying technologies that facilitate and/or enhance transmission capacity of existing facilities. Notwithstanding this considerable expenditure, there remains a continuing need for systems, methods, and structures that enhance the transmission capacity and information carrying ability of optical communications networks and such systems, methods, and structures would represent a welcome addition to the art.

SUMMARY

An advance in the art is made according to aspects of the present disclosure directed to systems, methods, and structures that advantageously provides an increase in the power efficiency of L-band Erbium-doped fiber amplifiers (EDFAs) while exhibiting low complexity and minimal impact on other system elements.

In sharp contrast to the prior art—systems methods, and structures according to the present disclosure eliminate the need for optical isolators positioned between circulators (or C WDM couplers) and amplifiers while advantageously operating in both unidirectional and bidirectional configurations.

Generalized improvements of systems, methods, and structures constructed/configured according to the present disclosure include—but are not limited to better performance, increased power efficiency of L-band amplifiers, reduced complexity, reduced packaging requirements, and no additional components.

Of further advantage, systems, methods, and structures according to the present disclosure advantageously provide bidirectional C-band and L-band optical transmission where the C-band and the L-band travel in opposite directions as well as in unidirectional C-band and L-band optical transmission where the C-band and the L-band travel in the same direction.

BRIEF DESCRIPTION OF THE DRAWING

A more complete understanding of the present disclosure may be realized by reference to the accompanying drawing in which.

DESCRIPTION

Figure 1:
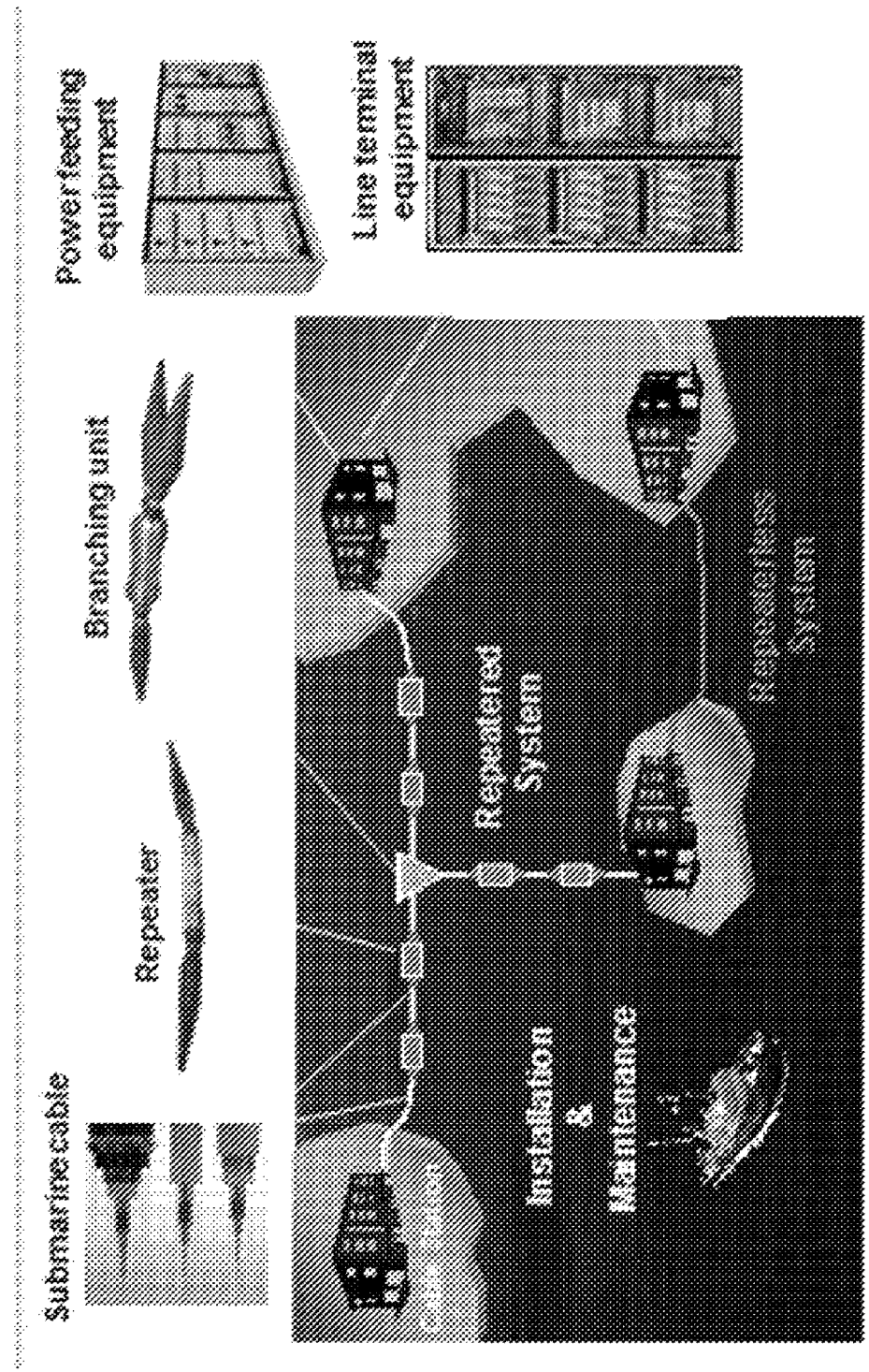
FIG. 1 is a schematic diagram illustrating a contemporary submarine cable system that may advantageously benefit from systems, methods, and structures according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGs comprising the drawing are not drawn to scale.

By way of some background, we begin by noting that submarine optical transmission systems—also called submarine cable systems—are arguably the true backbone of global communications systems. Nearly all data that travels between continents globally will be transported through submarine cable systems—typically now optical fiber systems—that are generally positioned on a sea bed. We note that while satellite communications systems are also used, its relatively limited bandwidth, long latency, high costs, and atmospheric/weather interference—as compared with submarine systems—make it much less desirable that such submarine transmission systems.

As will be readily appreciated by those skilled in the art, there are several facets of a submarine transmission system that sets it apart from other fiber communications namely: 1) it is very expensive to lay cable under water; 2) once the cable is laid it is very expensive to rplace, upgrade, or repair the cable; 3) all power (electrical) must be supplied from cable ends, as there are no undersea power sources.

Among other reasons, since it is so expensive to lay, upgrade, and/or repair undersea cables, systems, methods, and structures that allow or otherwise facilitate the transmission of a maximum amount of data via a given cable is most desirable, as expenses associated with such cable(s) would be recovered by selling such capacity—i.e., cost/bit—which advantageously is achieved according to the present disclosure.

Turning now to FIG. 1, there is shown a schematic diagram depicting an illustrative submarine transmission system. As will be appreciated, data to be transmitted may originate in one of the cable stations. It is transmitted (delivered) to other cable stations across the sea through a submarine cable.

Submarine cables generally include two parts: 1) cable spans; and 2) repeaters. The cable spans—which can be illustratively from 40 km to 150 km—or longer—are typically in the 50 km-80 km range. As may be observed from FIG. 1, cable spans include several elements such as those shown in the top of the figure such as—for example—repeater(s) and branching unit(s).

Those skilled in the art will readily understand and appreciate that undersea cables generally include a plurality of optical fibers and optical fibers are generally very thin (~250-micron diameter) strands of glass that can advantageously be employed to guide light with low attenuation. Despite this low attenuation, they nevertheless can experience a drop in optical power of 1% over a single span. Accordingly—and to overcome such attenuation drop in optical fiber—the art has employed optical amplifiers as part of repeater assemblies to amplify the optical power lost to the attenuation. In illustrative repeater assemblies, there is one amplifier dedicated to each individual optical fiber.

Of course, such amplifiers require electrical power to operate. As noted previously, such electrical power must be supplied from the end(s) of the cable which as further noted may be several thousand km in length. Such power is limited due—in part—to constraints arising from electrical conducting elements included in the cable. Accordingly, such limited power is experienced by all amplifiers in all of the repeaters throughout the undersea system. Consequently, any advance that increases the power efficiency of amplifiers will directly impact the cable capacity and therefore cost/bit. We not further that by power efficiency, we mean the ratio of the optical power transferred to an optical signal traversing the fiber to the electrical power consumed by the amplifier.

As is known by those skilled in the art, wavelength division multiplexing (WDM) is one of many major developments made to increase the data carrying capacity of optical networks. With WDM configurations, additional data carrying capacity(ies) are added to existing optical networks by increasing the number of data carrying wavelengths in the optical fibers. Accordingly, data carrying capacity of an individual fiber may be increased by employing more individual wavelengths in that fiber.

Figure 2:
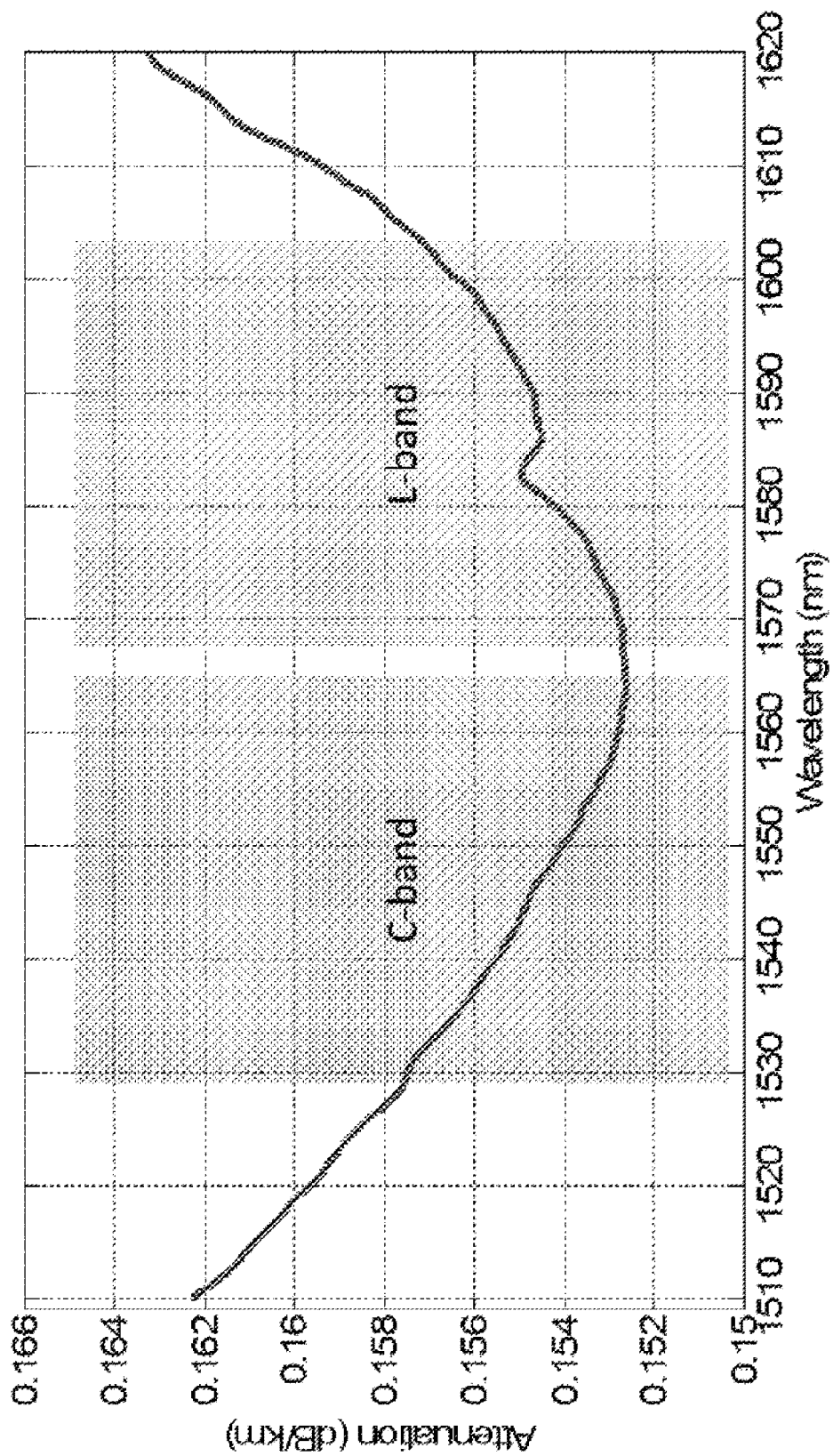
FIG. 2 is a plot of attenuation vs. wavelength illustrating fiber attenuation and transmission bands employed in contemporary optical fiber transmission facilities and networks.

While such capacity of a fiber can be increased by utilizing more and more wavelengths however, there is a limit to how many wavelengths a fiber can support. One such limitation results from the wavelength dependence of the attenuation of the fiber as shown in FIG. 2. As may be observed from that figure, attenuation is low only for a limited bandwidth—roughly between 1510 nm to 1620 nm—beyond which the attenuation becomes too large.

Another such limitation results from the amplification bandwidth of the amplifiers employed. More particularly, in fiber communication systems employing repeaters, the amplifiers used are almost exclusively of a type known in the art as erbium-doped fiber amplifiers (EDFAs) which may advantageously amplify roughly 30-40 nm of the overall bandwidth.

As is further known, there are two bands that are most relevant to long distance communications are shown in FIG. 2 as the C-band and the L-band. In contemporary optical systems, the C-band is primarily used as shown illustratively in the figure. Note that the location of this C-band is determined by physical parameters of the amplifiers used.

Those skilled in the art will readily understand and appreciate that it is possible to cover the L-band using similar amplifiers with a distinct design namely, L-band amplifiers Typically, L-band EDFAs exhibit a slightly worse performance as compared to C-band EDFAs—even though they cover roughly the same amount of bandwidth. As a result, C-band EDFAs are oftentimes used first. However, and as will become apparent and according to the present disclosure—the advantage(s) of using C- and L-band together is clear. For example, once the capacity of a C-band EDFA is exhausted, it is nevertheless possible to nearly double the capacity of a fiber by adding L-band amplifiers to repeater locations including C-band amplifiers. As will be readily understood by those skilled in the art, such "upgrade" may provide significant cost savings as compared with deploying additional optical fiber.

We note that one reason that L-band amplifiers exhibit a worse efficiency is that L-band EDFAs generate a large amount of noise. This noise is typically called amplified spontaneous emission (ASE) and is produced when a laser gain medium is pumped to produce a population inversion. While feedback of the ASE by the laser's optical cavity may produce laser operation if the lasing threshold is reached, excess ASE is an unwanted effect in lasers since it Is not coherent and limits the maximum gain that can be achieved in the gain.

Continuing with our discussion of noise, we note that part of this noise travels in the same direction as a signal and part of it travels in an opposite direction. In the case of L-band amplifiers, backward scattered ASE (b-ASE) in the C-band region is so large that it depletes the pump power at an input of the EDFA. As a result, optical signal(s) receive less amplification and therefore less signal is produced for a given pump power therefore power efficiency is reduced. Additionally, because b-ASE reduces gain at the input of the EDFA, this causes the ASE in the forward direction to increase. Typically, this effect is referred to a degradation of the amplifier's noise figure (NF). Those skilled in the art will know that NF is a measure of how much more the amplifier adds noise to the signal compared to an ideal amplifier.

At this point we note that the art has proposed several methods for increasing EDFA L-band power efficiency which generally reduce the b-ASE. Those two methods are: 1) using two-stage EDFAs—which may be extended to more stages as well; and 2) employing ASE seeding—or C-band seeding—which we call in this disclosure just C-seeding.

To understand these two methods, we note that the two-stage EDFA uses two (or more) amplifiers in series to achieve a required net total gain. This method works because each stage uses less pump power since each stage has less gain. When pump power is lower, the power in the pump is quickly depleted by the signal, and therefore not enough pump power is left to grow the b-ASE. One disadvantage to this method is two-fold: i) after the first stage, additional components—such as isolators—must be added to ensure that no stray light leaks from second (or subsequent) stage(s) into first (previous) stage(s). Also, additional pump(s) and signal combiner(s) are required for operation of the second (or subsequent) stage(s). These combiners introduce insertion loss(es) for the signal such that the NF of the combined two-stage amplifier will be reduced. In addition: ii) since this two-stage method requires the additional elements which add both to the cost of the amplifier(s) and the complexity and increased packaging requirements. These packaging requirements may be very stringent—especially for submarine systems—where all of the amplifiers and related components must be housed in a tight, watertight, package that comprises the repeater(s).

Turning our discussion to C-seeding, it is implemented by adding a small amount of light having a wavelength from the C-band (C-seed) into the L-band EDFA input together with an L-band signal. This method works because the Erbium-doped fiber (EDF) in the amplifier has a high absorption and emission cross section at C-band wavelengths compared to L-band wavelengths.

At an input to the of the EDF, the small C-seed grows very quickly and stops the b-ASE from growing in an input region. Closer to the end of the EDF at which point the pump power is reduced the C-seed start to be reabsorbed by the EDF due—in part—to a large absorption cross section at the C-band. Note however, that the L-band signal continues to grow such that—effectively—the C-seed took away pump power at the entrance to the EDF and gives it back to the L-band at the other end of the EDF. As a result, this method increases L-band EDFA efficiency and improves NF.

We finally note that in terms of implementation complexity—others have proposed different methods—but these other methods are all complicated in terms of application. They may require—for example—convoluted schemes with multiple stages, or adding additional components that split power from the C-band signal, or the ASE generated by the C-band ASE and redirect it into the L-band EDFA. And while it may be of concern how much C-seed power is needed and how to precisely control this power, base on our measurements we find that the C-seed power can be as low as 5 to 25 dB less than the power level of the L-band signal at EDFA input. Advantageously, we have also found that it is unnecessary to control this power level of the C-seed with high precision.

As we shall show, while systems, methods, and structures according to the present disclosure use a C-seed method, as will be shown it is advantageously performed very simply, with little or no added components—unlike the prior art.

To fully appreciate how systems, methods, and structures according to the present disclosure operates, we provide some additional background about implementing combined C-band and L-band transmission.

As is known, C-band(s) and L-band(s) are separate, and EDFAs employed are specific for amplification of their associated C-band signals and L-band signals only. As a result, prior to amplification, the C-band(s) and L-band(s) must be separated and the separate signals applied to appropriate amplifier(s). Conversely, after amplification, they need to be re-combined such that they traverse a common fiber once again. This illustrated schematically in FIG. 3.

As may be observed from that figure, C-band and L-band signals are shown propagating along a common optical path. The signals are separated through the effect of—for example—a C\L WDM coupler (also known as a WDM coupler or band coupler) and then directed into separate optical paths. These separate optical paths include amplifiers configured to amplify the particular signals traversing therein and the amplified signals are subsequently re-combined (by another C\L WDM for example) and the re-combined signals are output via a common optical path (fiber).

Figure 3:
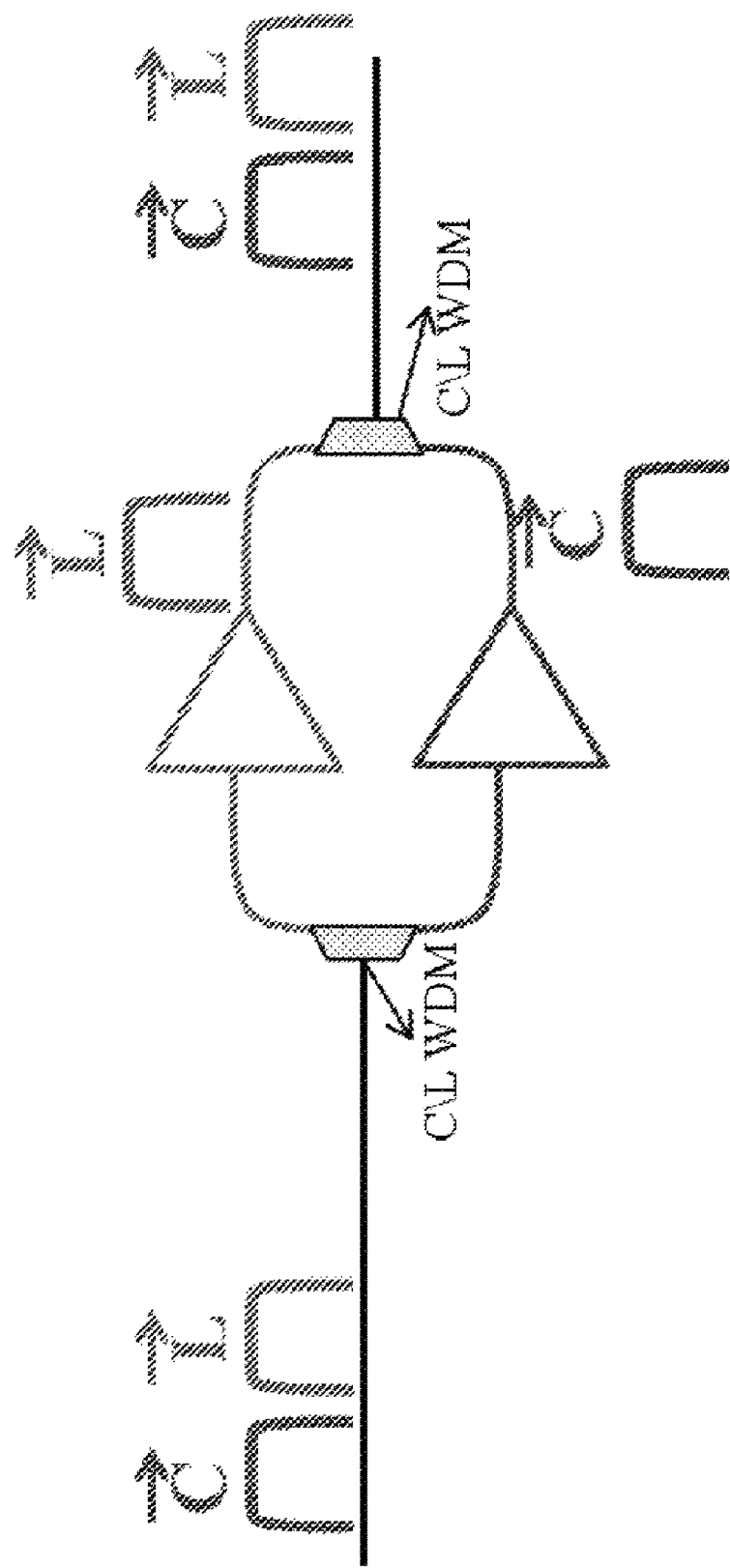
FIG. 3 is a schematic diagram showing an illustrative unidirectional implementation of C and L band transmission.

We note that a configuration such as that shown in FIG. 3 is known in the art as a unidirectional transmission system in that the C- and L-band signals travel in the same direction.

Figure 4:
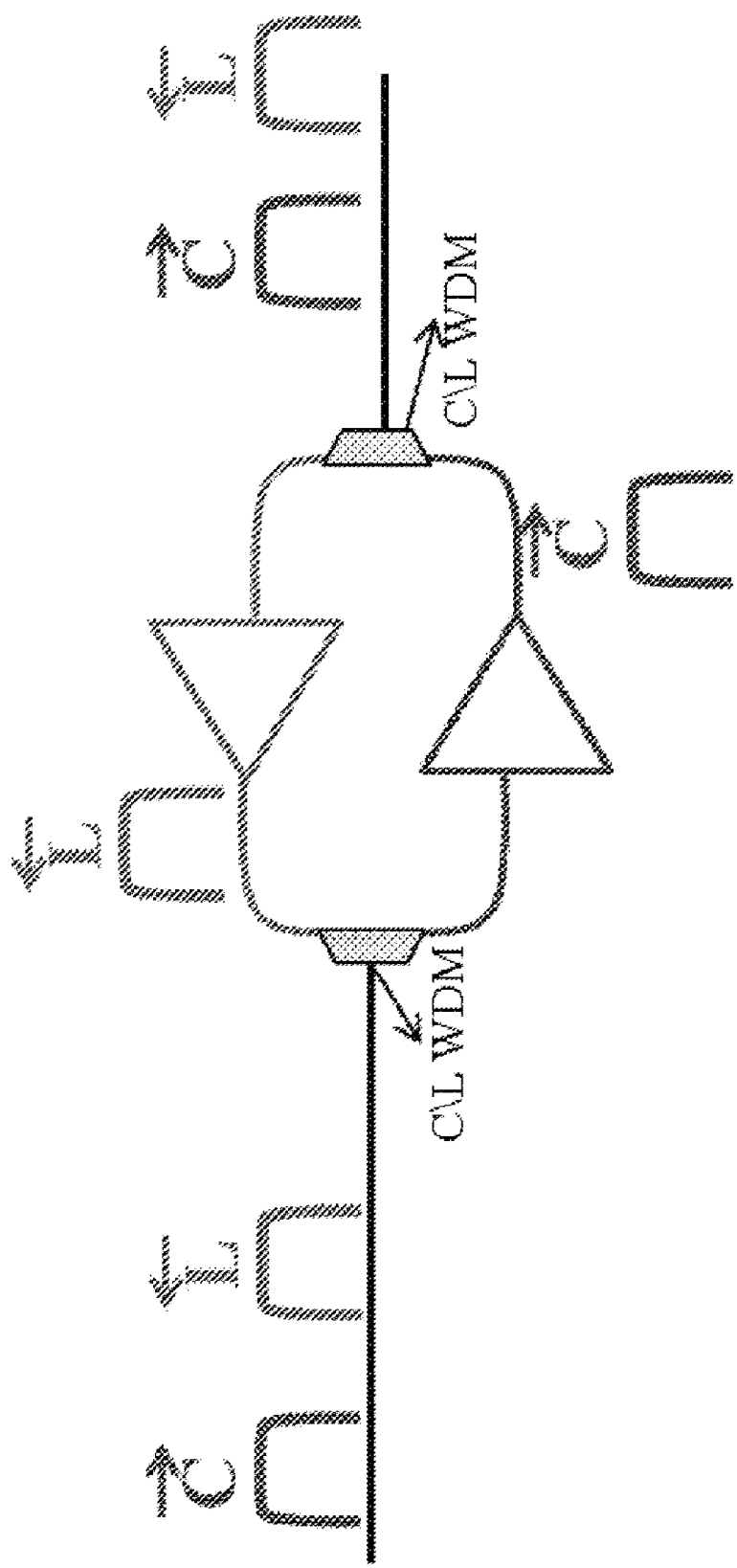
FIG. 4 is a schematic diagram showing an illustrative bidirectional implementation of C and L band transmission.

If, however, the C-band and L-band signals travel in opposite directions, such configurations are known in the art as bidirectional transmission systems and such a bidirectional system is shown schematically in FIG. 4. Note that since C\L WDM couplers as employed both split and combine optical signals based on their wavelengths, such couplers may advantageously be employed in both unidirectional and bidirectional systems.

Additionally, we note that what is shown in FIG. 3 and FIG. 4 is in fact only half of the system. Most systems are duplex transmission systems. As will be appreciated, with a duplex transmission system, for every data traveling from point A to point B there is a matching data channel carrying data from point B back to point A. In almost all cases a duplex transmission is achieved by a fiber pair. Basically, one of the fibers carry data from point A to B and the other fiber carries data from point B to point A.

Figure 5:
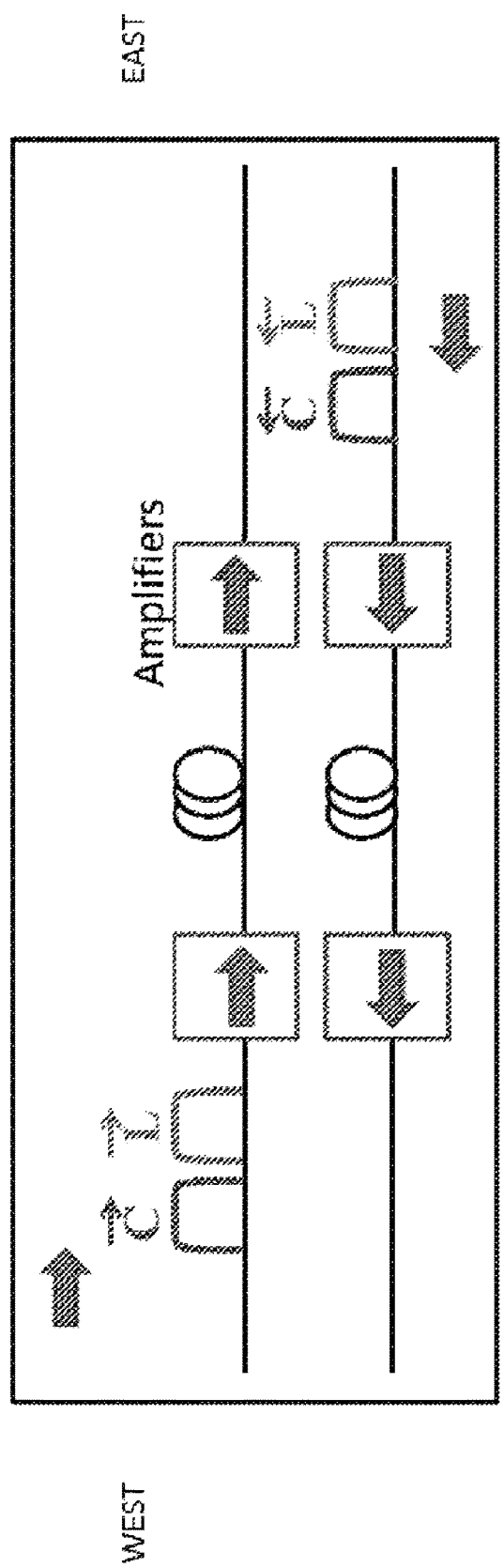
FIG. 5 is a schematic diagram showing an illustrative, contemporary duplex unidirectional implementation of C and L band transmission.

Turning now to FIG. 5, there is shown a schematic of an illustrative duplex transmission system in which on fiber (or several fiber spans) carries traffic in one direction (i.e., West to East) while another fiber (or several spans) carries traffic in an opposite direction. Note that both C-band and L-band signals may be carried on the directional fibers.

Figure 6:
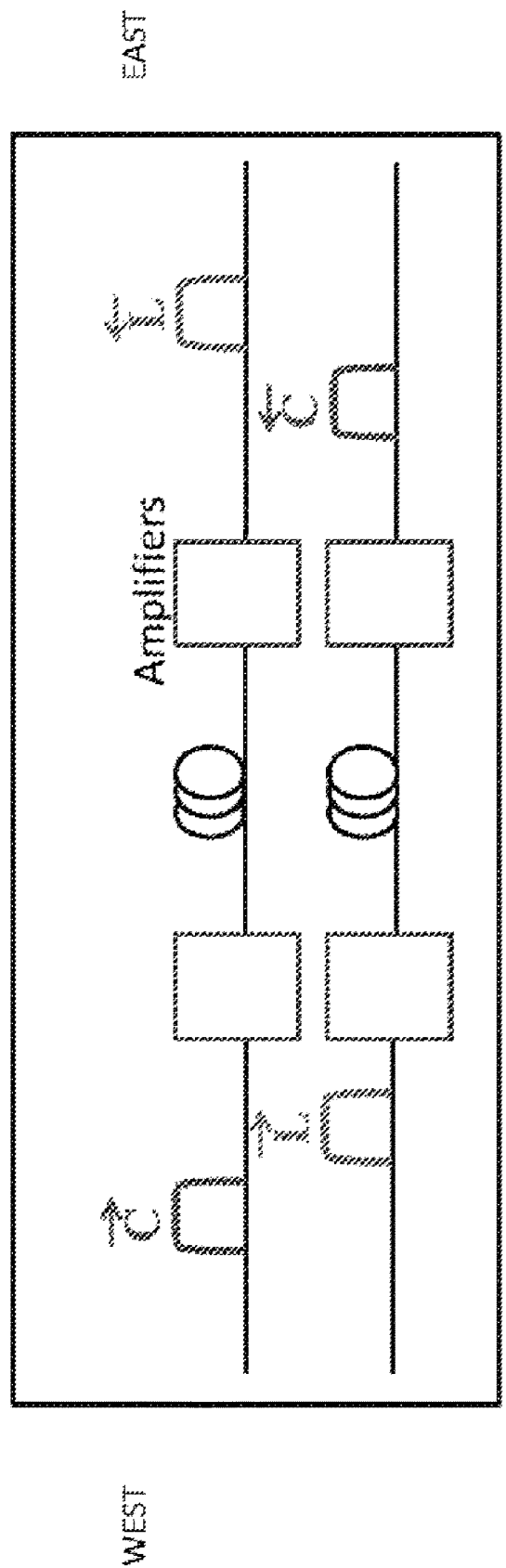
FIG. 6 is a schematic diagram showing an illustrative duplex bidirectional implementation of C and L band transmission.

FIG. 6 shows in schematic form an illustrative configuration for a bidirectional, duplex link. As may be observed from that figure, the top fiber carries—for example—C-band signals from West to East, while the bottom fiber carries C-band from East to West. Shown further in that figure the top fiber carries L-band signals from East to West, while the bottom fiber carries L-band signals from West to East.

Note that duplex bidirectional links are—as far as we know—not implemented in any known installation.

Recalling our discussion of FIG. 3, and FIG. 4, we note that according to the present disclosure one may advantageously employ circulators instead of C\L, couplers to implement the splitting and recombining of the C-band and L-band signals. Whereas the C\L, band WDM couplers of FIG. 3 and FIG. 4 differentiate and direct signals based on their wavelengths, circulators differentiate, and direct signals based on the direction in which they are traveling.

Figure 7:
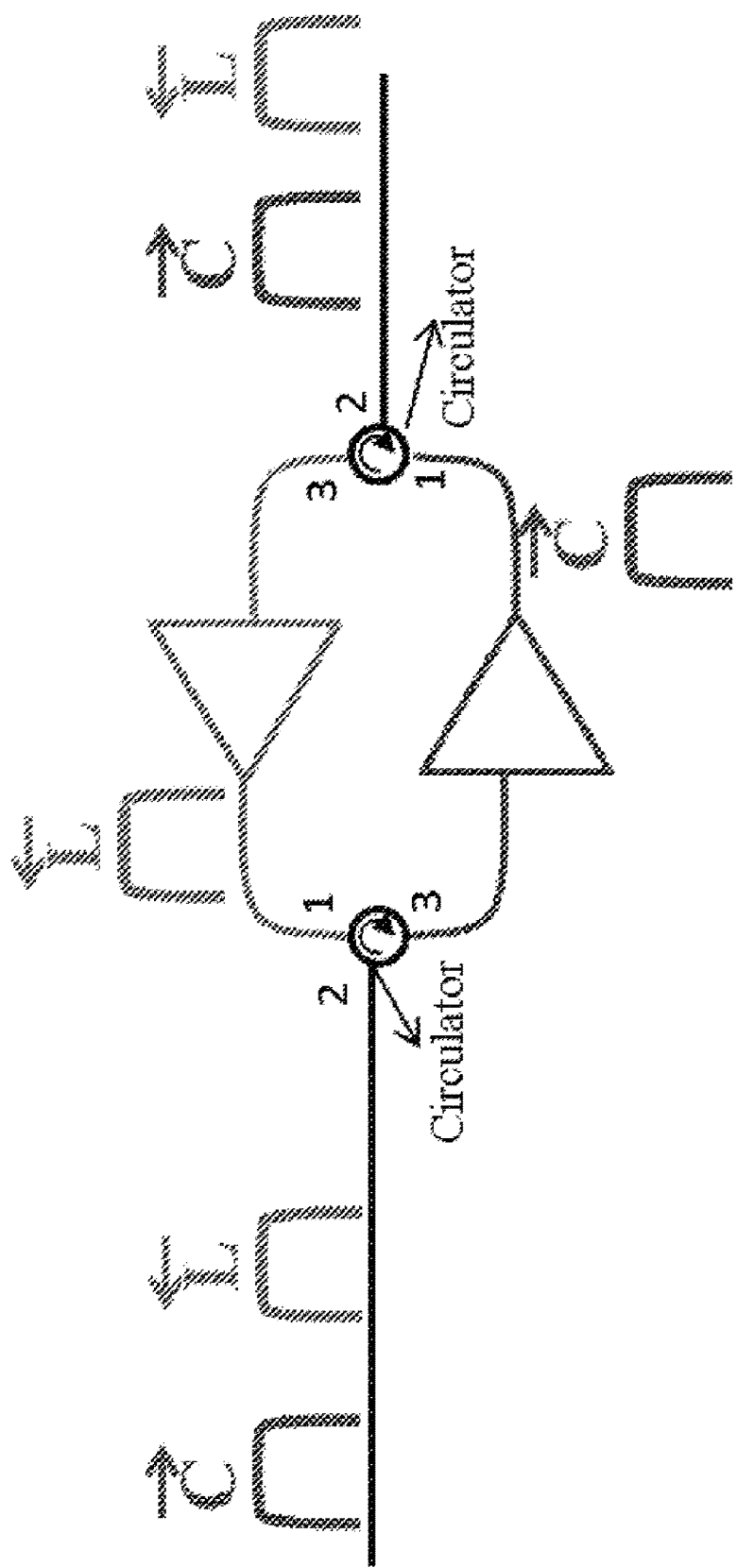
FIG. 7 is a schematic diagram showing an illustrative bidirectional C\L amplifier using circulators instead of C\L wavelength-division-multiplexed (WDM) couplers according to aspects of the present disclosure.

With reference now to FIG. 7, there is shown in schematic form an illustrative configuration of bidirectional C\L, amplifier using circulators according to aspects of the present disclosure instead of C\L WDM couplers as known in the art. As may be observed from that figure, each of the circulators has three ports namely, port 1, port 2, and port 3. The circulators operate such that light entering port 1 will exit port 2. Light entering port 2 will exit port 3. Finally, light entering the circulator at port 3 is blocked. From this schematic figure and this description, it may be understood how C-band and L-band traveling in opposite directions are directed into the appropriate amplifiers according to aspects of the present disclosure.

We note at this point a particular advantage of our inventive arrangement according to aspects of the present disclosure as shown in FIG. 7 wherein circulators are employed instead of C\L, WDM couplers. More particularly structures according to the present disclosure advantageously allow the removal of a component viewed as necessary in the art namely, an optical isolator which the art employs at the input to EDFAs.

One may more fully appreciate the differences between systems, methods and structures according to the present disclosure and illustratively shown in FIG. 7 which shows a bidirectional configuration using circulators, as compared to the prior art and how systems, methods, and structures according to the present disclosure advantageously achieve an improvement in power efficiency of L-band EDFAs through C-seeding that occurs without additional components.

This works as follows. The C-band signal that is amplified by C-band EDFA enters through port 1 of the circulator and subsequently into the fiber span with a large power. As will be appreciated by those skilled in the art, a portion of the C-band signal is reflected by the fiber through a process called Rayleigh scattering. Rayleigh scattering occurs naturally in fibers due to microscopic fluctuations in the glass density, and in general it cannot be avoided.

Stated it more succinctly, fibers are designed to have the lowest attenuation, and Rayleigh scattering is a major contributor to this attenuation. Therefore, this scattering is reduced as much as possible, however, it cannot be completely eliminating. Depending on the fiber type, and the span length, a level of light reflected by Rayleigh scattering could be as low as −38 dB and as high as −30 dB as compared to the power of the signal entering the fiber. Considering that the gain of EDFAs would—in general—be the same as the span loss, and that C-band and L-band experience similar span loss, the C-band signal power at the C-EDFA output can be 10 dB to 20 dB or more compared to the L-band signal at the EDFA input—depending on the fiber type and span length used. A conclusion one may draw from this is the C-band light that is scattered back by Rayleigh scattering would be about −28 dB to −10 dB less than the L-band signal power entering the L-band EDFA.

As noted above, C-seed power levels can improve the power efficiency of L-band EDFA. Here we provide an illustrative example.

Let's consider a new generation optical fiber, such as Vascade EX3000. For these fibers, the attenuation is about 0.155 dB/km. Considering a span length of 80 km we would have a span loss of about 12.4 dB which should be roughly the same as C and L-band amplifier gain. The Rayleigh scattering for these types of fibers are quite low, since their loss is low and because their effective core area is large.

Note that Rayleigh scattering could be about −37 db. In such case, the power of the C-band light that is reflected by the Rayleigh scattering would be about 24.6 dB less as compared to the power of L-band signal entering the L-band EDFA. Such seeding power would be sufficient to observe an improvement on the L-band power efficiency. Notice that this improvement is achieved by design and without adding additional components.

Another aspect of this C-seed method is that would not cause instability as in many cases where allowing reflected light to enter the amplifiers may. In this case the C-band and L-band EDFAs operate independently. The reflected light level would depend on the C-band signal level, and that in turn would affect the L-band signal power, however, this change in L-band power does not affect the C-band power. Therefore, there is no feed-back mechanism that may cause instability.

For this method to work however—and according to still another aspect of the present disclosure—it is preferred that the configuration is bidirectional, and that circulators are used instead of C\L, WDM couplers. In other words, even though this improvement comes for free, the C\L, band should be designed correctly to achieve this. We note at this point that while we prefer a bidirectional configuration that includes circulators, the structures and methods according to the present disclosure will in fact work with unidirectional configurations and C\L, WDM couplers.

For instance, in the case of bidirectional configuration, if C\L, WDM couplers are used instead of circulators, the C-band light reflected by Rayleigh scattering would be redirected into the C-band EDFA because C\L, WDM couplers direct light based on their wavelength.

Figure 8:
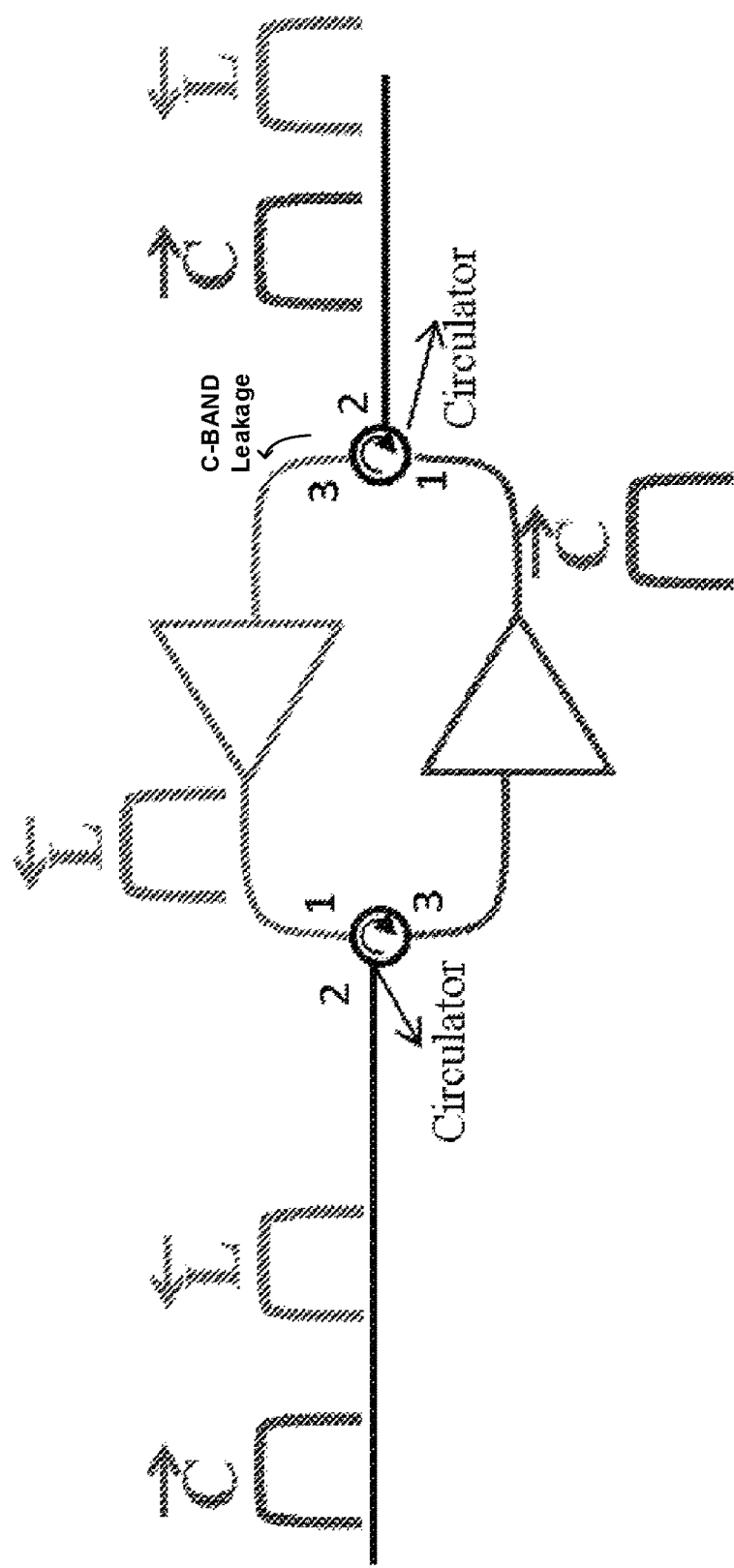
FIG. 8 is a schematic diagram showing an illustrative implementation of bidirectional C and L band transmission and C-band leakage into the input of the L-band amplifier according to aspects of the present disclosure in which circulators are used.
Figure 9:
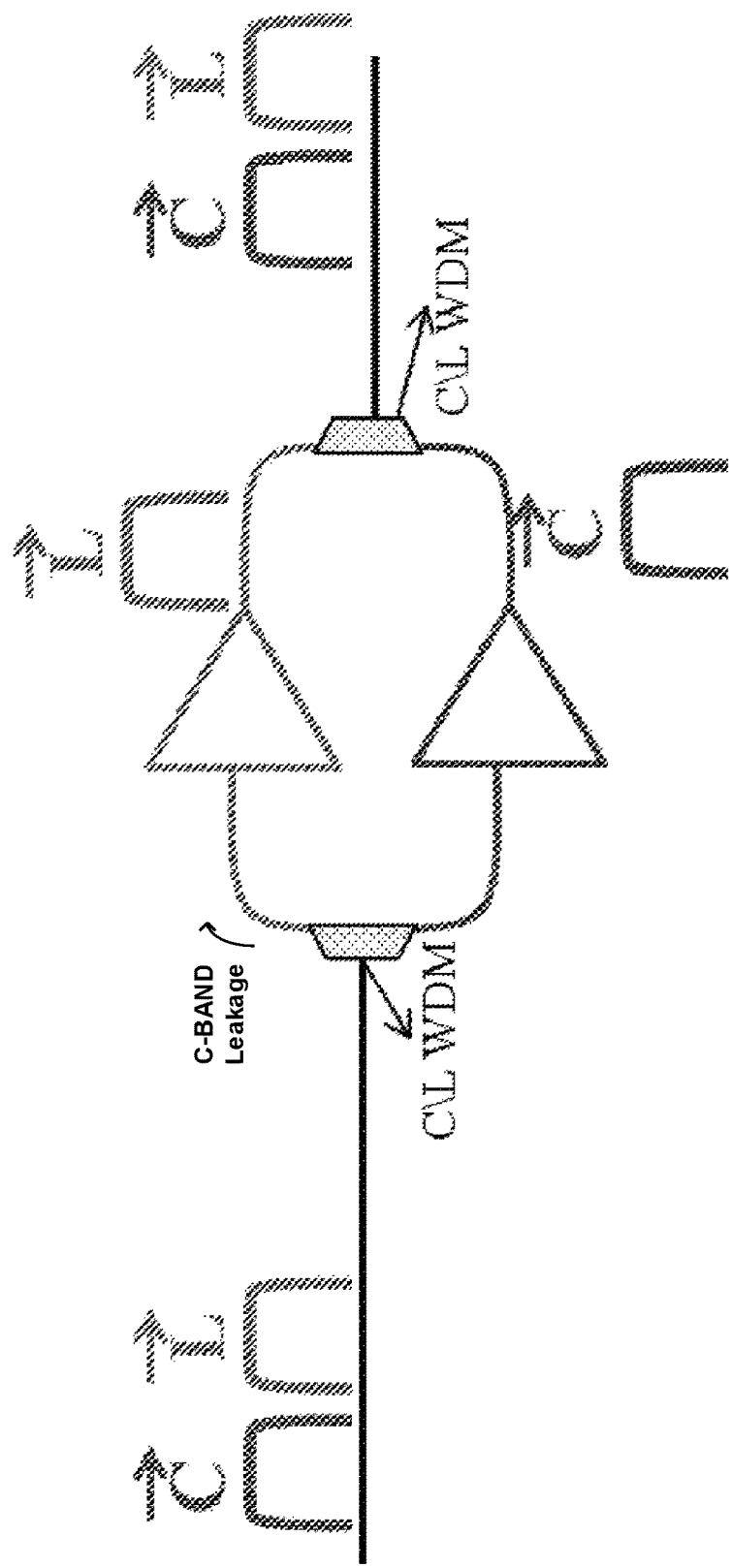
FIG. 9 is a schematic diagram showing an illustrative implementation of unidirectional C and L band transmission and C-band leakage into the input of the L-band amplifier according to aspects of the present disclosure in which C\L WDM couplers are used.
Figure 10:
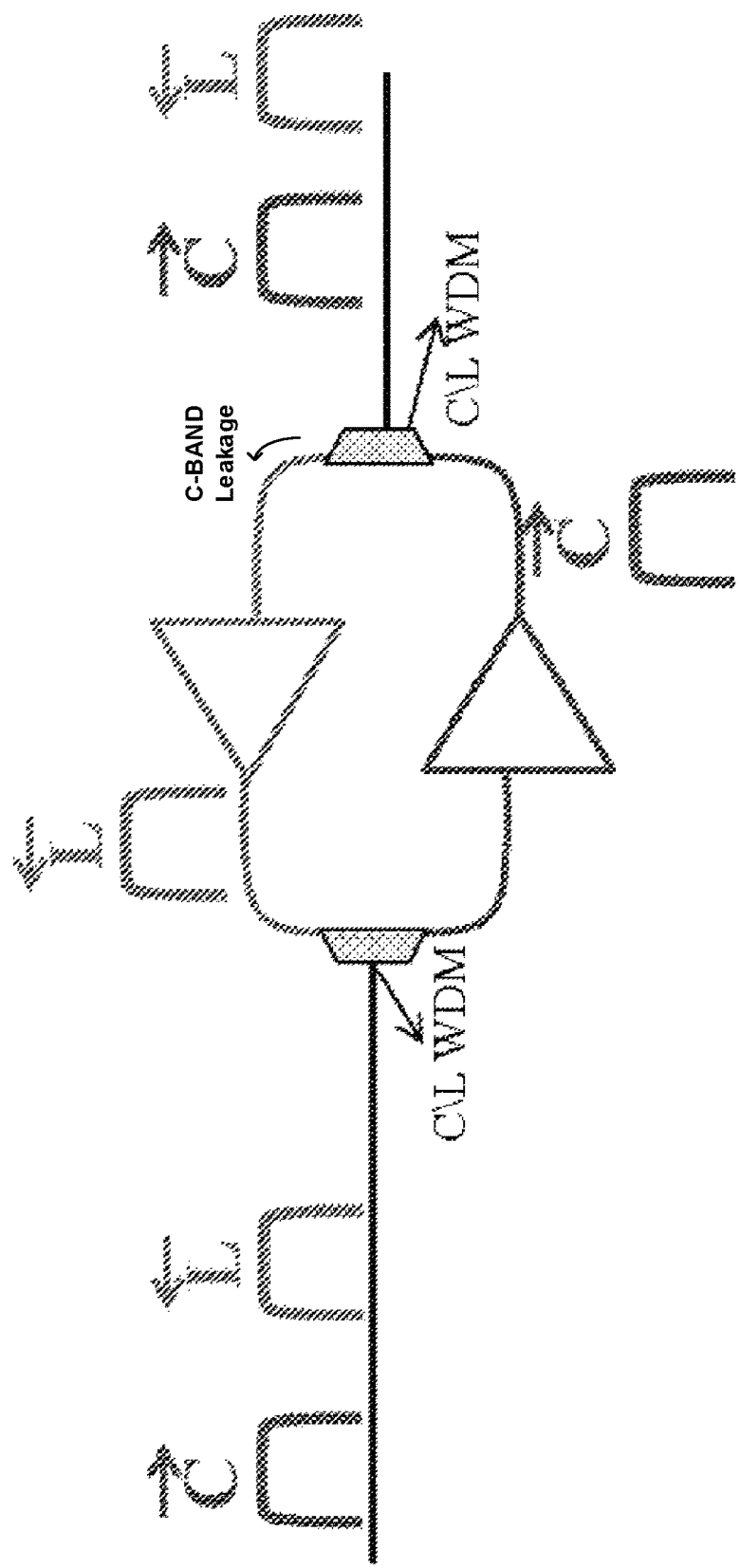
FIG. 10 is a schematic diagram showing an illustrative implementation of bidirectional C and L band transmission and C-band leakage into the input of the L-band amplifier according to aspects of the present disclosure in which C\L WDM couplers are used.

Advantageously—and according to yet another aspect of the present disclosure—by designing the C\L, coupler or circulator and configuring same so that there is leakage from the C-band arm to the L-band arm by a designed amount efficiency is improved. Of further advantage, our method will work for both unidirectional and bidirectional configurations and whether either circulators or C\L WDM couplers are used as shown illustratively in FIG. 8 and FIG. 9.

To illustrate our inventive method and structures, we begin describing an illustrative bidirectional configuration using C\L WDM couplers, and then explain how it can be applied to the other cases.

In general, C\L WDM couplers are designed so that there is very high isolation between the C-band and L-band arms. For example, there is no L-band signal left in the C-band port, and there would be no C-band signal left in the L-band arm. However, this could be easily changed by designing the C\L, couplers. According to aspects of the present disclosure, C\L couplers at the input port side of the L-band amplifiers are designed so that they leak some of the C-band power into the L-band port. The C\L couplers at the output port of the L-band EDFAs retain high isolation, so that there would be no cross-talk at the C-band side. Such configuration is shown illustratively in FIG. 9.

This method has the following advantages. Using the example link parameters above, in the unidirectional configuration, the power level of the C-band and L-band signals arriving at the amplifiers would be the same. If we assume 1% leakage from the C-band to the L-band that would bring the C-secd power to −20 dB below that of the L-band signal. This would sufficient to see power efficiency improvement. Larger leakage power (i.e., 10%) from the C-band may improve the power efficiency more, however this would come at the expense of removing more power from the C-band. Removing power from the C-band especially at the point where the C-band power is the lowest can have an impact on the C-band EDFA NF.

An additional aspect of our disclosure is that the leakage can be optimized in its spectrum. For instance, the leakage can be designed so that there is more leakage from the short end side of the L-band spectrum compared to the longer side of the spectrum. This is because the short side of the C-band spectrum especially around 1528-1530 nm where the EDFA gain peak is more effective at suppressing b-ASE compared to longer side. As a result, one can remove less power from the C-band while having the same level of improvement at the L-band power efficiency. Moreover, leakage from the shorter side can be more efficiently absorbed by the L-band EDFA, and therefore the possibility of crosstalk to the C-band at the output side would be reduced which would therefore reduce the requirement of high isolation on the C\L coupler on the output side of the L-band EDA.

Here we explain the same method in the case of bidirection using C\L, couplers. In this case, again we propose to design the C\L, coupler at the input end of the L-band EDFA to have a controlled leakage from C-band port to the L-band port. The advantage of implementing this invention in the case of bidirectional configuration is that the input end of the L-band EDFA corresponds to the output end of the C-band EDFA. In this case, at the C\L, coupler at the input end of the L-band EDFA power level of the C-band signal is higher than the power level of the L-band signal by a factor of the EDFA gain, typically 10 dB to 20 dB higher. As a result, even 1% leakage from the C-band port can bring in significant amount of C-seeding light into the L-band EDA. Using the above link example above, with 12.4 dB amplifier gain, and removing only 1% from the C-band EDFA, one can provide C-seeding power into the L-band EDFA that is only −7.4 dB below the L-band signal level. Note that removing power from the output side of the C-band EDFA would not deteriorate the NF measurably.

There is another significant advantage to employing systems, methods, and structures according to the present disclosure a bidirectional configuration. In general C-band EDFAs provide larger gain at the shorter wavelength with the gain peak occurring at about 1529 nm. However, in transmission systems it is necessary to keep the power and SNR levels of the WDM channels uniform, and therefore, it is necessary to flatten the gain shape of the EDFA. This typically done by using passive optical filters called gain flattening filter (GFF) that remove power from the portions of the gain spectrum where the power is high. Most of this power is removed from the gain peak around 1529 nm. Since this is also the location that benefits the most for the C-seed, it is possible to design the C\L, coupler at the input end of the L-band EDFA to leak this part of the spectrum more. Also, any gain flattening filter can be designed in a way that would produce a flat gain including the transmission spectrum of the C\L band coupler. In this fashion, we would be using the portion of the C-band EDFA output that is normally thrown away to boost the power efficiency of the L-band EDFA. Note the same advantage can also be used for the case of unidirectional, however, in that case the part of the C-band spectrum around 1529 nm would remain higher than the rest of the WDM channels through the fiber span. In that case the WDM channels around 1529 nm would experience additional nonlinearity penalty due to fiber nonlinearity.

Of course, and as noted previously, systems, methods, and structures described above for the case of C\L WDM coupler in the case of bi-directional scheme can be extended to the case where circulators are used. In the case of circulators, the circulator at the input end of the L-band EDFA can be designed such that there is leakage from its port 1 to its port 3.

At this point, while we have presented this disclosure using some specific examples, those skilled in the art will recognize that our teachings are not so limited. Accordingly, this disclosure should be only limited by the scope of the claims attached hereto.

The invention claimed is:

1. An improved optical transmission system for carrying C-band and L-band optical signals, the system having a C-band optical path including a C-band optical amplifier and an L-band optical path including an L-band optical amplifier, wherein the C-band optical path and the L-band optical path are substantially isolated from one another, said system including an input optical path and an optical circulator, said input optical path in optical communication with the optical circulator, the circulator in further optical communication with the C-band optical path and the L-band optical path, said system including an output optical path and a second circulator, said second optical circulator in optical communication with the C-band optical path at a point in the path after the C-band optical amplifier, said second optical circulator in optical communication with the L-band optical path at a point in the path before the L-band optical amplifier, and said optical circulator in optical communication with the output path, said system CHARACTERIZED IN THAT:

the system is configured such that a pre-determined amount of C-band optical energy is applied to an input of the L-band optical amplifier;

the amount of C-band optical energy applied to the input is the L-band optical amplifier is more than 1% but less than 10% of the total C-band optical energy and is between 5 to 25 dB less than the power level of an L-band signal input to the L-band optical amplifier;

the optical circulator is configured to apply the pre-determined amount of C-band optical energy to the L-band optical path such that it is received by the L-band optical amplifier;

the optical circulator directs a portion of the C-band optical energy output from the C-band optical amplifier to an input of the L-band optical amplifier; and no optical isolators are interposed between the circulators and the amplifiers.

2. The improved optical transmission system according to claim 1 FURTHER CHARACTERIZED IN THAT the system is a unidirectional transmission system and both C-band optical energy and L-band optical energy traverse the system in the same direction.

3. The improved optical transmission system of claim 1 FURTHER CHARACTERIZED IN THAT the system is a bidirectional transmission system and both the C-band optical energy and L-band optical energy traverse the system in directions opposite to one another.

* * * * *